(12) United States Patent
Nishimura

(10) Patent No.: US 7,024,229 B2
(45) Date of Patent: Apr. 4, 2006

(54) MOBILE TERMINAL DEVICE TO CONTROLLING INCOMING CALL NOTIFYING METHOD

(75) Inventor: Yasunori Nishimura, Tokyo (JP)

(73) Assignee: NEC Corporation, Tokyo (JP)

( * ) Notice: Subject to any disclaimer, the term of this patent is extended or adjusted under 35 U.S.C. 154(b) by 530 days.

(21) Appl. No.: 10/183,476

(22) Filed: Jun. 28, 2002

(65) Prior Publication Data

US 2003/0008687 A1  Jan. 9, 2003

(30) Foreign Application Priority Data

Jul. 6, 2001  (JP) ............................. 2001-206218

(51) Int. Cl.
*H04M 1/00* (2006.01)

(52) U.S. Cl. ...................... 455/567; 455/425; 455/458; 379/373.02; 379/374.03; 379/376.01

(58) Field of Classification Search ............. 455/414.1, 455/418, 425, 458, 550.1, 566, 567; 379/373.01, 379/373.02, 374.03, 376.01
See application file for complete search history.

(56) References Cited

U.S. PATENT DOCUMENTS

| | | |
|---|---|---|
| 5,844,983 A | 12/1998 | Lilja |
| 6,285,891 B1 * | 9/2001 | Hoshino ..................... 455/567 |
| 6,751,485 B1 * | 6/2004 | Ranta ......................... 455/567 |
| 6,816,577 B1 * | 11/2004 | Logan ........................ 379/67.1 |
| 2001/0014616 A1 * | 8/2001 | Matsuda et al. ............ 455/567 |
| 2002/0010008 A1 * | 1/2002 | Bork et al. .................. 455/567 |
| 2002/0076033 A1 * | 6/2002 | Baweja et al. ......... 379/373.01 |

FOREIGN PATENT DOCUMENTS

| | | |
|---|---|---|
| EP | 1 172 991 A1 | 1/2002 |
| GB | 2 358 553 A | 7/2001 |
| WO | WO 00/43963 A1 | 7/2000 |

* cited by examiner

*Primary Examiner*—William Trost
*Assistant Examiner*—James D. Ewart
(74) *Attorney, Agent, or Firm*—Sughrue Mion, PLLC

(57) ABSTRACT

When there is an incoming call, a mobile terminal device detects ambient sounds by a microphone. A filter separates the detected ambient sounds into a speech component and a non-speech component. An analysis section analyzes which one of the speech component and the non-speech component is the dominant component. A decision section selects a ringing tone generating section, a vibrator or a light emitting section based on which one of the speech component and the non-speech component is the dominant component and the volume of that dominant one. The selected ringing tone generating section, vibrator or light emitting section makes ringing to inform a user of the incoming call.

78 Claims, 6 Drawing Sheets

| | SPEECH COMPONENT IS DOMINANT | NOISE COMPONENT IS DOMINANT |
|---|---|---|
| VOLUME OF DOMINANT COMPONENT IS HIGH | VIBRATION | VIBRATION RINGING TONE |
| VOLUME OF DOMINANT COMPONENT IS LOW | VIBRATION LIGHT EMISSION | RINGING TONE |

|  | SPEECH COMPONENT IS DOMINANT | NOISE COMPONENT IS DOMINANT |
|---|---|---|
| VOLUME OF DOMINANT COMPONENT IS HIGH | VIBRATION | VIBRATION RINGING TONE |
| VOLUME OF DOMINANT COMPONENT IS LOW | VIBRATION LIGHT EMISSION | RINGING TONE |

|  | SPEECH COMPONENT IS DOMINANT | NOISE COMPONENT IS DOMINANT |
|---|---|---|
| VOLUME OF DOMINANT COMPONENT IS VERY HIGH | VIBRATION RINGING TONE LIGHT EMISSION | VIBRATION RINGING TONE LIGHT EMISSION |
| VOLUME OF DOMINANT COMPONENT IS HIGH | VIBRATION | VIBRATION RINGING TONE |
| VOLUME OF DOMINANT COMPONENT IS LOW | VIBRATION LIGHT EMISSION | RINGING TONE |

MOBILE TERMINAL DEVICE TO CONTROLLING INCOMING CALL NOTIFYING METHOD

BACKGROUND OF THE INVENTION

1. Field of the Invention

The present invention relates to an incoming call ringing method for a mobile terminal device, such as a portable telephone or PHS.

2. Description of the Related Art

In mobile communication with portable telephones, a user normally carries around a mobile terminal device in power ON mode and can make and receive a call anytime. Depending on the location or situation where a user is present, however, there may be case where generating a ringing tone would bother people in the adjacent area.

Recent mobile terminal devices are equipped with a reception mode called a manner mode. The manner mode is a reception mode that is used in case where generation of a ringing tone would bother people, such as in a movie theater or a train, or during a meeting, and does not generate a ringing tone at the time of receiving a call. In many cases, a user is informed of an incoming call by a vibrator instead of generating a ringing tone in manner mode.

Some mobile terminal devices generate a key-operation acknowledge tone at the time of making a call and at the time of sending and receiving e-mail. With the manner mode set, however, such a key-operation acknowledge tone is not generated in most cases.

Normally, the manner mode is set manually by a key operation by a user. In cases where the manner mode should be set, however, a user may forget the setting, or a user may forget to cancel the manner mode. Therefore, a ringing tone may be generated at a quiet place or an incoming call may not be noticed because of generation of no ringing tone. To overcome them, there are methods contrived that automatically set and cancel the manner mode.

One conventional method of automatically setting and canceling the manner mode is to store base station IDs for setting and canceling the manner mode in a mobile terminal device. According to the method, a mobile terminal device, which has stored base station IDs for setting and canceling, goes into the manner mode automatically when entering an area of a base station with the appropriate base station ID for setting the manner mode. Once the mobile terminal device enters an area of a base station with the base station ID for cancellation of the manner mode, it automatically goes to the normal reception mode when it leaves the area.

Another method of automatically setting and canceling the manner mode is to measure surrounding noise and automatically adjust the volume or timbre of a ringing tone according to the measured value.

The method of automatically setting and canceling the manner mode based on a base station ID can enable setting and cancellation only base station by base station and is effective for a PHS for which an area covered by a single base station is narrow. In a PDC type portable telephone system, in which an area covered by a base station is wide, it is difficult to enable the setting and cancellation of the manner mode.

The method of automatically adjusting the volume or timbre of a ringing tone according to the measured value of surrounding noise automatically sets and cancels the manner mode based on the volume, regardless of the surrounding situation. Therefore, there may be a case where the manner mode is set when the manner mode is not actually needed, or a case where the manner mode is not set when the manner mode should be set.

SUMMARY OF THE INVENTION

The present invention is devised in view of the above-described problems. The present invention provides a mobile terminal device that automatically selects proper ringing means that adequately reflects the surrounding situation.

A portable terminal device of the present invention comprises a plurality of notifying means for notifying a user of an incoming call, detecting means for detecting ambient sounds, separating means for separating the ambient sounds into a first component in a voice band and a second component in a band other than the voice band and controlling means for controlling the notifying means on the basis of the first component and the second component. The mobile terminal device further comprises analyzing means for determining that one of the first component and the second component is the dominant component from a relationship between volumes thereof. The mobile terminal device further comprises selecting means for selecting at least one of the plurality of notifying means based on which one of the first component and the second component is the dominant component and a volume of that dominant component. The first component is a speech component and the second component is a non-speech component. The plurality of notifying means comprises a tone ringing means, a vibrating means and a light emitting means. The selecting means selects the vibrating means when the speech component is the dominant component and exceeds a first threshold value, selects the vibrating means when the speech component is the dominant component and is equal to or smaller than the first threshold value, selects the vibrating means and the tone ringing means when the non-speech component is the dominant component and exceeds a second threshold value, and selects the tone ringing means when the non-speech component is the dominant component and is equal to or smaller than the second threshold value. The selecting means selects both the vibrating means and the light emitting means when the speech component is the dominant component and is equal to or smaller than a first threshold value. The selecting means may select the vibrating means, the tone ringing means and the light emitting means together when the speech component is the dominant component and exceeds a third threshold value greater than the first threshold value and when the noise component is the dominant component and exceeds a fourth threshold value greater than the second threshold value. The analyzing means determines which one of the speech component and the non-speech component is the dominant component by acquiring peak values of the volumes of the speech component and the non-speech component at least once and comparing a maximum of the peak values of the speech component with a maximum of the peak values of the non-speech component. Alternatively, the analyzing means may determine which one of the speech component and the non-speech component is the dominant component by acquiring peak values of the volumes of the speech component and the non-speech component at least once and comparing an average value of the peak values of the speech component with an average value of the peak values of the non-speech component. Also, the analyzing means may also determine the band of the non-speech component beforehand, and determines which one of the speech component and the non-speech component is the dominant component by acquiring integral values of the volumes of the speech component and the non-speech component at least once and comparing a maximum of the integral values of the speech component with a maximum of the integral values of the non-speech component. Alternatively, the analyzing means can determine the band of the non-speech component beforehand, and determines which one of the speech component and the non-speech component is the dominant component by acquiring integral values of the volumes of the speech component and the non-speech component at least once and comparing an average value of the integral values of the speech component with an average value of the integral values of the non-speech component. The analyzing means preferably determines which one of the speech component and the non-speech component is the dominant component by using a correlation function. The analyzing means changes a volume of the tone ringing means in accordance with the volume of the dominant component. The analyzing means may change a timbre of the tone ringing means in accordance with the volume of the dominant component. The analyzing means periodically updates which one of the speech component and the non-speech component is the dominant component. The analyzing means may update which one of the speech component and the non-speech component is the dominant component at the time of performing location registration.

An incoming call ringing method of the present invention for a mobile terminal device includes detecting ambient sounds, separating the ambient sounds into a first component in a voice band and a second component in a band other than the voice band, deciding how to notify a user of an incoming call in accordance with the first component and the second component, receiving the incoming call and notifying a user of the incoming call on the basis of the determination of how to notify the user. The incoming call ringing method for a mobile terminal device further comprises determining that one of the first component and the second component is the dominant component from a relationship between volumes thereof and controlling the notifying step based on which one of the first component and the second component is the dominant component and a volume of that dominant one. The first component is a speech component and the second component is a non-speech component. The notifying step is at least one of ringing tones, vibrating and emitting light.

A portable terminal device of the present invention includes a plurality of notifying portions that notify a user of an incoming call, detector that detects ambient sounds, separator that separates the ambient sounds into a first component in a voice band and a second component in a band other than the voice band and controller that controls the notifying means on the basis of the first component and the second component. The mobile terminal device further comprises analyzer that determines that one of the first component and the second component is the dominant component from a relationship between volumes thereof and selector that selects at least one of the plurality of notifying portions based on which one of the first component and the second component is the dominant component and a volume of that dominant component. The first component is a speech component and the second component is a non-speech component. The plurality of notifying portions comprises tone ringing portion, a vibrator and light emitting portion. The selector selects the vibrator when the speech component is the dominant component and exceeds a first threshold value, selects the vibrator when the speech component is the dominant component and is equal to or smaller than the first threshold value, selects the vibrator and the tone ringing portion when the non-speech component is the dominant component and exceeds a second threshold value, and selects the tone ringing portion when the non-speech component is the dominant component and is equal to or smaller than the second threshold value. The selector selects the vibrator and the light emitting portion are selected together when the speech component is the dominant component and is equal to or smaller than a first threshold value. The selector may select all of the vibrator, the tone ringing portion and the light emitting portion when the speech component is the dominant component and exceeds a third threshold value greater than the first threshold value and when the noise component is the dominant component and exceeds a fourth threshold value greater than the second threshold value. The analyzer determines which one of the speech component and the non-speech component is the dominant component by acquiring peak values of the volumes of the speech component and the non-speech component at least once and comparing a maximum of the peak values of the speech component with a maximum of the peak values of the non-speech component. The analyzer may determine which one of the speech component and the non-speech component is the dominant component by acquiring peak values of the volumes of the speech component and the non-speech component at least once and comparing an average value of the peak values of the speech component with an average value of the peak values of the non-speech component. The analyzer may also determine the band of the non-speech component beforehand, and determines which one of the speech component and the non-speech component is the dominant component by acquiring integral values of the volumes of the speech component and the non-speech component at least once and comparing a maximum of the integral values of the speech component with a maximum of the integral values of the non-speech component. Alternatively, the analyzer can determine the band of the non-speech component beforehand, and determines which one of the speech component and the non-speech component is the dominant component by acquiring integral values of the volumes of the speech component and the non-speech component at least once and comparing an average value of the integral values of the speech component with an average value of the integral values of the non-speech component. The analyzer preferably determines which one of the speech component and the non-speech component is the dominant component by using a correlation function. In addition, the analyzer changes a volume of the tone ringing portion in accordance with the volume of the dominant component. Also, the analyzer may change a timbre of the tone ringing portion in accordance with the volume of the dominant component. The analyzer periodically updates which one of the speech component and the non-speech component is the dominant component. The analyzer may update which one of the speech component and the non-speech component is the dominant component at the time of performing location registration.

A mobile terminal device comprising a plurality of notifying portions that notify a user of an incoming call, a detector that detects ambient sounds, a signal processor that separates the ambient sounds into a first component in a voice band and a second component in a band other than the voice band, and a controller that controls the notifying portions on the basis of the first component and the second component. The signal processor determines that one of the first component and the second component is a dominant component from a relationship between volumes thereof, and the controller selects at least one of the plurality of notifying portions based on which one of the first component and the second component is the dominant component and a volume of that dominant one. The plurality of notifying portions comprise a tone ringing portion, a vibrator and a light emitting portion. The controller selects the vibrator when the speech component is the dominant component and exceeds a first threshold value, selects a vibrator when the speech component is the dominant component and is equal to or smaller than the first threshold value, selects the vibrator and the tone ringing portions when the non-speech component is the dominant component and exceeds a second threshold value, and selects the tone ringing portions when the non-speech component is the dominant component and is equal to or smaller than the second threshold value. The controller select the vibrator and the light emitting portion when the speech component is the dominant component and is equal to or smaller than a first threshold value. Alternatively, the controller selects the vibrator, the tone ringing portion and the light emitting portion when the speech component is the dominant component and exceeds a third threshold value greater than the first threshold value and when the noise component is the dominant component and exceeds a fourth threshold value greater than the second threshold value. The signal processor determines which one of the speech component and the non-speech component is the dominant component by acquiring peak values of the volumes of the speech component and the non-speech component at least once and comparing a maximum of the peak values of the speech component with a maximum of the peak values of the non-speech component. Alternatively, the signal processor determines which one of the speech component and the non-speech component is the dominant component by acquiring peak values of the volumes of the speech component and the non-speech component at least once and comparing an average value of the peak values of the speech component with an average value of the peak values of the non-speech component. Alternatively, the signal processor determines the band of the non-speech component beforehand, and determines which one of the speech component and the non-speech component is the dominant component by acquiring integral values of the volumes of the speech component and the non-speech component at least once and comparing a maximum of the integral values of the speech component with a maximum of the integral values of the non-speech component. In an alternate embodiment, the signal processor determines the band of the non-speech component beforehand, and determines which one of the speech component and the non-speech component is the dominant component by acquiring integral values of the volumes of the speech component and the non-speech component at least once and comparing an average value of the integral values of the speech component with an average value of the integral values of the non-speech component. The signal processor determines which one of the speech component and the non-speech component is the dominant component by using a correlation function, and the signal processor changes a volume of the tone ringing portion in accordance with the volume of the dominant component. Also, the signal processor changes a timbre of the tone ringing portion in accordance with the volume of the dominant component. The signal processor can periodically update which one of the speech component and the non-speech component is the dominant component. Finally, the signal processor updates which one of the speech component and the non-speech component is the dominant component at the time of performing location registration.

According to the present invention, as ambient sounds are separated into a speech component and a non-speech component, a dominant component is determined by comparing them and optimal incoming call ringing means is selected based on the dominant component and the volume thereof, therefore, it is possible to estimate the surrounding situation in consideration of human voices distinguished from noise sounds and select the incoming call ringing means that adequately reflects the surrounding situation. Thus, the user will not bother people around by forgetting the setting of the manner mode or will not miss an incoming call.

Further, vibration is selected when a speech component is the dominant component and its volume is high as in a lecture, vibration is also selected when a speech component is the dominant component and its volume is not so high as in a meeting, vibration and a ringing tone are selected when a non-speech component is the dominant component and its volume is high as in a situation where there is noise and a ringing tone is selected when a non-speech component is the dominant component and its volume is low as in a daily life environment. It is therefore possible to separately use a ringing tone and vibration adequately in accordance with the surrounding situation.

In case where ambient sounds are too large for a user to hear a ringing tone, therefore, the incoming call is notified with all the incoming call ringing means, so that the user can know an incoming call even at a place with heavy noise.

Further, maximums of the peak values of a speech component and a non-speech component are compared with each other, so that changes in the volumes of the speech component and non-speech component do not cause a variation in selection and the surrounding situation can adequately be reflected on the selection of incoming call ringing means.

Alternatively, average values of the peak values of a speech component and a non-speech component are compared with each other, so that changes in the volumes of the speech component and non-speech component do not cause a variation in selection and the surrounding situation can adequately be reflected on the selection of incoming call ringing means.

Alternatively, maximum values of the integral values of the volumes of a speech component and a non-speech component are compared with each other, so that changes in the volumes of the speech component and non-speech component do not cause a variation in selection and the surrounding situation can adequately be reflected on the selection of incoming call ringing means.

Because a speech component can adequately be compared with a non-speech component by adjustment with a coefficient, the selection of proper incoming call ringing means is possible.

It is possible to analyze which one of a speech component and a non-speech component is the dominant component by using a correlation function, so that the surrounding situation can adequately be reflected on the selection of incoming call ringing means.

It is possible to notify a user of an incoming call by calling out with a ringing tone of a low volume in a relatively quiet situation to reduce the irritation to the user himself or people around and by calling out with a ringing tone of a high volume in a relatively noisy situation.

Because which one of a speech component and a non-speech component is the dominant component is updated periodically, the then optimal ringing means that reflects a change in surrounding situation can be selected.

Since which one of the speech component and the non-speech component is the dominant component is updated at the time of location registration at which a change in surrounding situation is likely to have occurred, it is possible to reflect a change in surrounding situation promptly.

BRIEF DESCRIPTION OF THE DRAWINGS

These and other aspects, features and advantages of the invention will become more fully apparent from the following detailed description taken in conjunction with accompanying drawings.

DETAILED DESCRIPTION OF THE INVENTION

Hereinafter, each embodiment of the present invention will be described in detail with reference to the drawings.

In most cases, a user always carries around a mobile terminal device and there are various surrounding situations where the user can find them. For example, in the situation where human voices are relatively loud, but there are few other noises, such as in a lecture, a situation where there are human voices that are not so loud, such as in a meeting, a situation where there are some human voices but the voices and noise are both low, such as in a library, an environment on streets where there are engine sounds of automobiles, a situation where there is a lot of noise, such as in a train, a situation where there is some noise that does not have a high noise level, and a situation where there is noise so loud that a user cannot hear a ringing tone.

In a situation where there is large noise but it is not desirable to generate a ringing tone, often it is a case where restraining of the use of a portable telephone is requested by broadcasting in the train. If one intends to set the manner mode, therefore, it is less likely to forget setting it. By way of contrast, in a quiet environment or an environment where there are few noises other than human voices, there is a prohibition of the use of a portable telephone or disabling of a ringing tone is requested on signs, and the user is likely to miss the signs and forget setting the manner mode.

The invention predicts the surrounding situation and select the optimal incoming call ringing method in consideration of the level relationship between the volume of human voices and the volume of other sounds as well as the volume of ambient sounds.

An embodiment of the invention will be described in detail with reference to the accompanying drawings.

Figure 1:
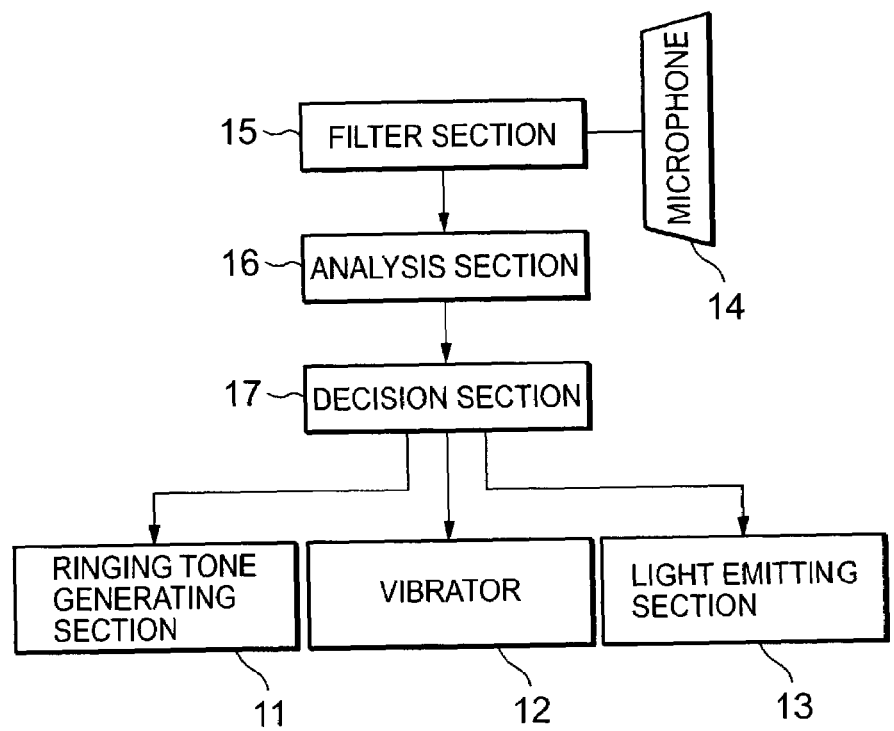
FIG. 1 is a block diagram showing the structure of a mobile terminal device according to an embodiment of the invention.

FIG. 1 is a block diagram showing the structure of a mobile terminal device according to an embodiment of the invention.

Referring to FIG. 1, a mobile terminal device according to an embodiment of the invention comprises a ringing tone generating section 11, a vibrator 12, a light emitting section 13, a microphone 14, a filter section 15, an analysis section 16 and a decision section 17.

The ringing tone generating section 11 generates a ringing tone at the time of receiving a call. The user can select whether or not a ringing tone is to be generated. The user can also set the volume of the ringing tone in advance. The vibrator 12 notifies a user of an incoming call through vibration. The light emitting section 13 emits light to inform the user of an incoming call by light. The light emitting section 13 informs an incoming call by, for example, lighting or blinking light of an LED or the backlight of a push button provided on the mobile terminal device, or a change in displayed color on the display screen. The microphone 14 detects ambient sounds and converts them to an electric signal.

The filter section 15 separates a signal of ambient sounds received by the microphone 14 into a frequency component of human voices and a frequency component of other sounds (hereinafter called noise). Hereinafter the frequency component of human voices is called a speech component and the frequency component of noise is called a noise component. Here, a component with a voice band of 0.3 to 3.4 kHz is a speech component and a component of the other bands is a noise component. The analysis section 16 analyzes the surrounding situation by comparing the volumes of the speech component and the noise component, acquired by the filter section 15, by a predetermined method. For example, the surrounding situation is determined by which one of the speech component and the noise component is the dominant component and whether or not the dominant component exceeds a predetermined threshold value. The decision section 17 selects one of the incoming call ringing means from the result of the analysis by the analysis section 16 and controls the ringing tone generating section 11, the vibrator 12 and the light emitting section 13.

The structure of the ringing tone generating section 11 will be described.

Figure 2:
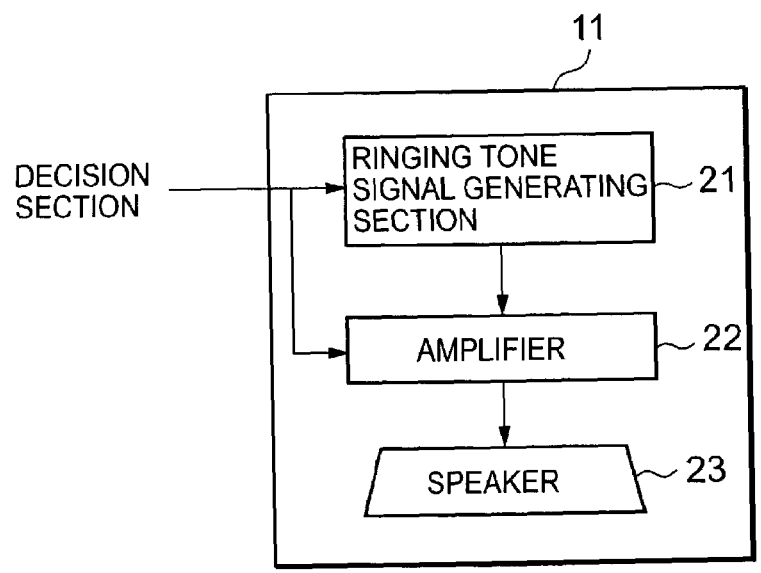
FIG. 2 is a block diagram showing the structure of the ringing tone generating section 11.

FIG. 2 is a block diagram showing the structure of the ringing tone generating section 11. Referring to FIG. 2, the ringing tone generating section 11 has a ringing tone signal generating section 21, an amplifier 22 and a speaker 23.

The ringing tone signal generating section 21 generates a signal for an incoming call, such as a ringing tone or an incoming call melody, in response to an instruction from the decision section 17. The amplifier 22 amplifies the signal of the ringing tone, by an amplification rate instructed by the decision section 17. The speaker 23 generates a ringing tone by the incoming call signal that is generated by the ringing tone signal generating section 21 and amplified by the amplifier 22.

A description will be given of the conditions for selecting incoming call ringing means in the analysis section 16 and the decision section 17.

Figures 3, 4:
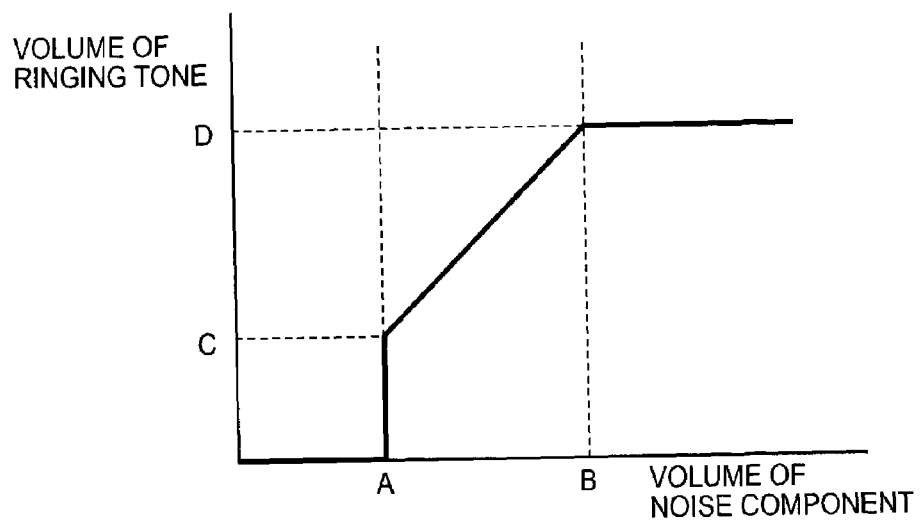
FIG. 3 is a table showing conditions set for selecting incoming call ringing means from the results of the analysis by the analysis section 16.
FIG. 4 is a graph showing an example of the relationship between the volume of a noise component and the volume of a ringing tone.

FIG. 3 is a table showing conditions set for selecting incoming call ringing means from the results of the analysis by the analysis section 16. The analysis section 16 analyzes to which one in FIG. 3 the surrounding situation corresponds. In FIG. 3, if the volume of a dominant component is high, then a speech component or noise component which is the dominant component exceeds a voice threshold value or noise threshold value. Likewise, if the volume of a dominant component is low means that a speech component or noise component which is the dominant component is equal to or lower than the voice threshold value or noise threshold value.

Referring to FIG. 3, the decision section 17 selects call notification by vibration when a speech component is the dominant component and the dominant speech component exceeds a predetermined voice threshold value. The decision section 17 selects call notification by vibration and light emission when a speech component is the dominant component and the dominant speech component is equal to or smaller than the voice threshold value. The decision section 17 selects call notification by vibration and a ringing tone when a noise component is the dominant component and the dominant noise component exceeds a predetermined noise threshold value. The decision section 17 selects call notification by a ringing tone when a noise component is the dominant component and the dominant noise component is equal to or smaller than a predetermined noise threshold value.

One example of a method of determining which one of a speech component and a noise component is the dominant component is to periodically measure the peak values of the speech component and noise component plural times, compare their maximum values with each other and determine a larger one as a dominant one. It is also the maximum values that are compared with the voice threshold value and the noise threshold value.

To adequately compare a speech component with a noise component at the time of comparing the maximum values with each other, comparison may be made by multiplying one or both of the speech component and the noise component by a predetermined coefficient. For example, the coefficient is determined in such a way that a speech component becomes dominant in a meeting or a lecture and a noise component becomes dominant on streets or under an ordinary living environment. The coefficient may be settable by a user. This can ensure proper determination on the dominance with the coefficient that matches the living environment of the user.

The voice threshold value and noise threshold value both are predetermined threshold values. For example, the voice threshold value is set to a value between the voice of a speaker in a lecture and a voice in a daily conversation in such a way as to be able to distinguish them from each other. For example, the noise threshold value is set to a value between them in such a way as to be able to discriminate whether or not the user can hear a ringing tone. The voice threshold value and noise threshold value may be settable by a user. This can ensure proper determination based on the threshold value matches the living environment of the user. In case of selecting call notification by a ringing tone, the user can also select the volume of the ringing tone.

FIG. 4 is a graph showing an example of the relationship between the volume of a noise component and the volume of a ringing tone.

Referring to FIG. 4, the decision section 17 does not generate a ringing tone when the volume of the noise component is equal to or lower than a predetermined threshold value A. The decision section 17 generates a ringing tone with a volume according to the volume of the noise component when the volume of the noise component is higher than the threshold value A and is equal to or lower than a predetermined volume B (B>A). When the volume of the noise component is the threshold value A, the ringing tone has a minimum ringing tone volume C. When the volume of the surrounding noise is the volume B, the ringing tone has a maximum ringing tone volume D. When the volume of the surrounding noise is higher than the volume B, the decision section 17 generates a ringing tone with the maximum ringing tone volume D.

The threshold value A and the volumes B, C and D may be settable by a user. When the volume of the noise component is equal to or lower than the predetermined threshold value A, the decision section 17 may generate a ringing tone with the minimum ringing tone volume C.

The operation of the mobile terminal device will now be described.

The mobile terminal device analyzes the surrounding situation by means of the analysis section 16, regardless of whether or not there is an incoming call. The mobile terminal device causes the decision section 17 to have determined, from the analysis result, which incoming call ringing means to select, if there is an incoming call at that time. If there is an incoming call, the mobile terminal device causes the decision section 17 to immediately inform a user of the incoming call by using the incoming call ringing means.

A description will be given of the operation of the mobile terminal device at the time of analyzing the surrounding situation and determining the incoming call ringing means.

Figure 5:
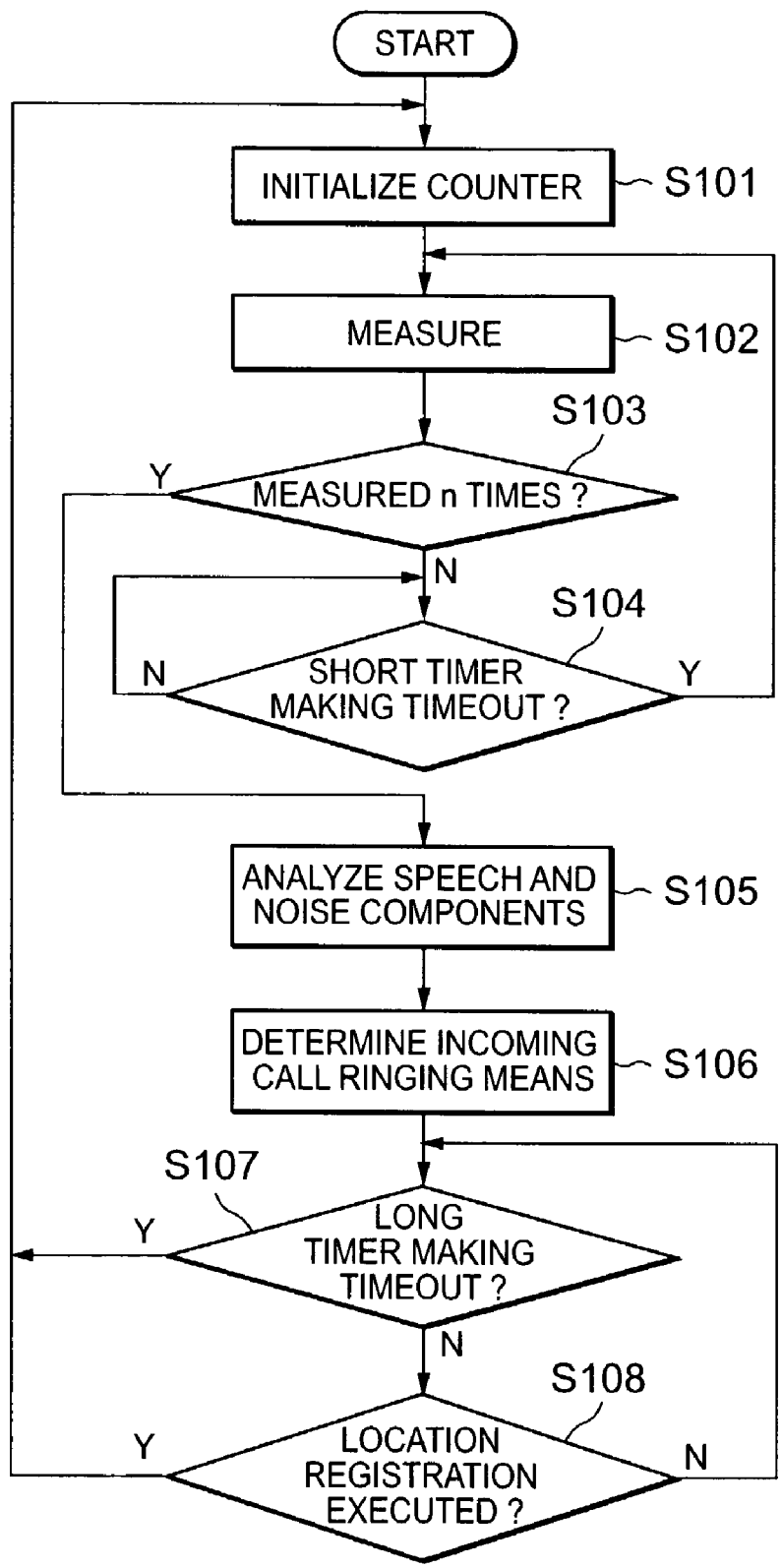
FIG. 5 is a flowchart illustrating the operation of the mobile terminal device at the time of determining incoming call ringing means.

FIG. 5 is a flowchart illustrating the operation of the mobile terminal device at the time of determining incoming call ringing means. Referring to FIG. 5, the mobile terminal device initializes a counter for counting the number of continuous measurements to zero in S101. In S102, the mobile terminal device measures the peak values of a speech component and noise component and increments the counter by 1. In S103, the mobile terminal device determines whether or not the number of continuous measurements has reached the value n. The value n is the number of times measuring is performed to eliminate a variation in determination caused by changes in the volumes of the speech component and noise component.

When the number of continuous measurements has not reached n, the mobile terminal device starts a short timer that is a timer of the cycle of continuous measurements and waits for the timer to make timeout in S104. When the short timer makes timeout, the mobile terminal device returns to the process of S102.

When the number of continuous measurements has reached n, the mobile terminal device extracts maximum ones of the peak values of the speech component and noise component and analyzes the surrounding situation by comparing them by a predetermined method in S105. Accordingly, the mobile terminal device determines which one of the speech component and the noise component is the dominant component or whether or not the dominant frequency component exceeds its corresponding threshold value.

In S106, the mobile terminal device determines which incoming call ringing means to select from the analysis result in S105. In S107, the mobile terminal device starts a long timer of the cycle for determining incoming call ringing means and waits for the timer to make timeout. In S108, the mobile terminal device always monitors execution of location registration while the long timer makes timeout. When the long timer makes timeout or the location registration is executed, the mobile terminal device returns to the process of S101.

Note that, for example, the short timer is a timer of about several seconds to several tens of seconds, and the long timer is a timer of about several minutes to several tens of minutes.

Although the analysis section 16 and the decision section 17 operate according to the set conditions shown in FIG. 3 in the illustrated embodiment, other conditions may be set. In the case where ambient sounds are large enough for a user to be unable to hear a ringing tone, the user may be notified of the incoming call by all of vibration, a ringing tone and light emission. In this case, the first and second voice threshold values and first and second noise threshold values are provided. It is assumed that the second voice threshold value is greater than the first voice threshold value and the second noise threshold value is greater than the first noise threshold value. And, at the time of analyzing the surrounding situation from the volume of the speech component and the volume of the noise component, the analysis section 16 determines which one of the speech component and the noise component is the dominant component and compares the peak value of the dominant component with the first and second voice or noise threshold values. The first voice threshold value and the first noise threshold value are the same as the voice threshold value used in the example of FIG. 3. The second voice threshold value and the second noise threshold value are threshold values which can discriminate that the ambient sounds are large enough for the user to be unable to hear a ringing tone.

Therefore, the mobile terminal device separates the ambient sounds into a speech component and a noise component in the filter section 14, analyzes the relationship between their levels and the level of a dominant one of them in the analysis section 15, and determines at least a single optimal one of the ringing tone generating section 11, the vibrator 12 and the light emitting section 13 in the decision section 17 from the analysis result, so that incoming call ringing which is suitable for the situation predictable from the ambient sounds can be executed and the user will not bother people around by forgetting the setting of the manner mode or will not miss an incoming call.

Further, the mobile terminal device can notify a user of an incoming call by calling out with a ringing tone of a low volume in a relatively quiet situation to reduce the irritation to a user or to the people around, and by calling out with a ringing tone of a high volume in a relatively noisy situation.

Figures 6, 7:
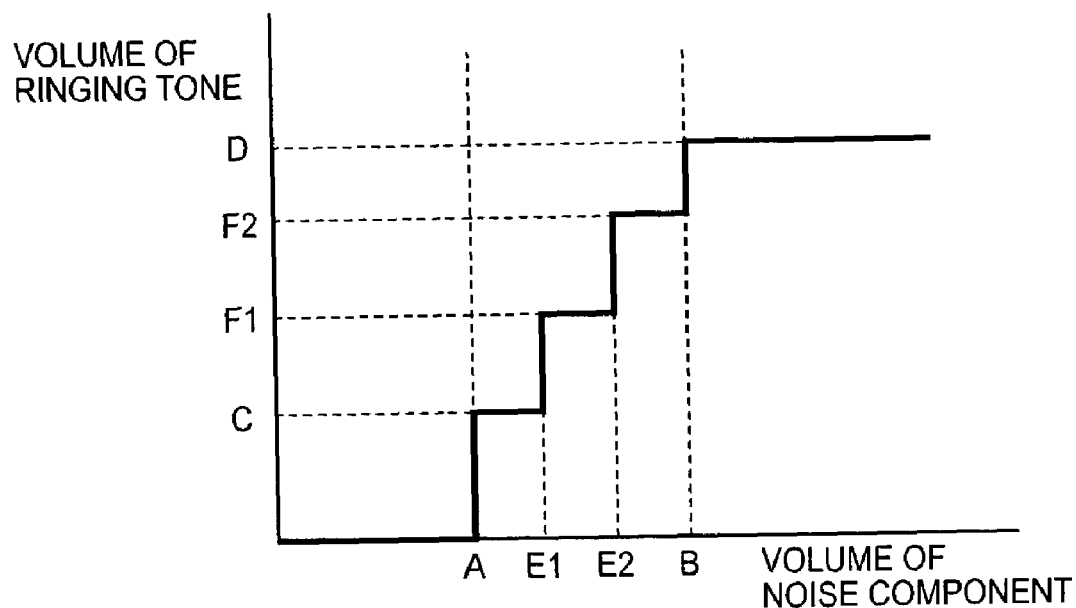
FIG. 6 is a table showing other set conditions according to an embodiment of the invention.
FIG. 7 is a graph showing another example of the relationship between the volume of a noise component and the volume of a ringing tone.

FIG. 6 is a table showing other set conditions according to an embodiment of the invention. In FIG. 6, the volume of a dominant component being very high means that a speech component or noise component which is the dominant component exceeds the second voice threshold value or noise threshold value. Likewise, the volume of a dominant component being high means that a speech component or noise component which is the dominant component exceeds the first voice threshold value or noise threshold value and is equal to or lower than the second voice threshold value or noise threshold value. The volume of a dominant component being low means that a speech component or noise component which is the dominant component is equal to or lower than the first voice threshold value or noise threshold value.

Referring to FIG. 6, the decision section 17 selects call notification by vibration, a ringing tone and light emission when a speech component is the dominant component and the dominant speech component exceeds the second voice threshold value. The decision section 17 selects call notification by vibration when a speech component is the dominant component and the dominant speech component exceeds the first voice threshold value but is equal to or smaller than second voice threshold value. The decision section 17 selects call notification by vibration and light emission when a speech component is the dominant component and the dominant speech component is equal to or smaller than the first voice threshold value.

The decision section 17 selects call notification by vibration, a ringing tone and light emission when a noise component is the dominant component and the dominant noise component exceeds the second noise threshold value. The decision section 17 selects call notification by vibration and a ringing tone when a noise component is the dominant component and the dominant noise component exceeds the first noise threshold value but is equal to or smaller than second noise threshold value. The decision section 17 selects call notification by a ringing tone when a noise component is the dominant component and the dominant noise component is equal to or smaller than the first noise threshold value.

When ambient sounds are large enough for a user to be unable to hear a ringing tone, therefore, the mobile terminal device performs call notification by vibration and light emission together with a ringing tone, so that the user can respond to an incoming call even in a situation there heavy noise.

Although the decision section 17 generates a ringing tone with a volume corresponding to the volume of the noise component when the voice of the noise component is larger than the threshold value A and is equal to or lower than a predetermined volume in the illustrated embodiment, there may be other cases.

FIG. 7 is a graph showing another example of the relationship between the volume of a noise component and the volume of a ringing tone. In the example of FIG. 7, threshold values E1 and E2 are further provided in a range where the volume of the noise component is higher than the threshold value A and is equal to or lower than the volume B. When the volume of the noise component is higher than the threshold value A and is equal to or lower than the threshold value E1, the decision section 17 sets the volume of the ringing tone to the minimum ringing tone volume C. When the volume of the noise component is higher than the threshold value E1 and is equal to or lower than the threshold value E2, the decision section 17 sets the ringing tone to a volume F1. When the volume of the noise component is higher than the threshold value E2 and is equal to or lower than the volume B, the decision section 17 sets the ringing tone to a volume F2. The threshold values E1 and E2 and the volumes F1 and F2 could be set by a user.

Although the mobile terminal device adjusts the volume of a ringing tone in accordance with the volume of the surrounding noise, not only the volume of the ringing tone but also the timbre of the ringing tone including a melody therefor may be adjusted. The timbre of the ringing tone alone may be adjusted.

This can ensure selection of more effective ringing tones, such as notification of an incoming call by a pleasant melody in a relatively quiet situation or notification of an incoming call with a timbre which is likely to attract people's attention in a relatively noisy situation.

Although which one of a speech component and a noise component is the dominant component is determined by comparing maximum values among those measured plural times with each other in the illustrated embodiment, other methods can be used. For example, average values of peak values measured plural times can be compared with each other and a larger one could be set as a dominant one. Further, the band of the noise component can be set to a predetermined band and the integral value of a speech component can be compared with the integral value of the noise component. A dominant component may also be determined by using a correlation function.

Another embodiment of the invention will be described with reference to the accompanying drawings.

Figure 8:
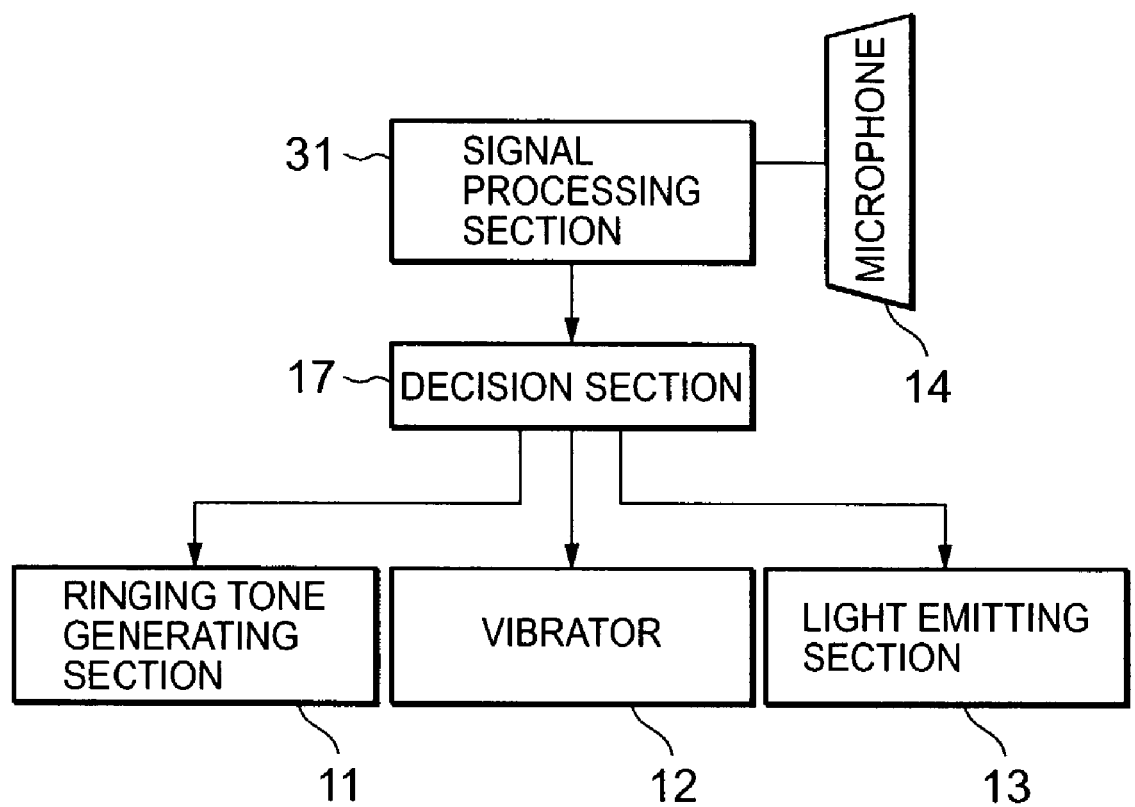
FIG. 8 is a block diagram showing the structure of a mobile terminal device according to another embodiment of the invention.

FIG. 8 is a block diagram showing the structure of a mobile terminal device according to another embodiment of the invention.

Referring to FIG. 8, the mobile terminal device has a ringing tone generating section 11, a vibrator 12, a light emitting section 13, a microphone 14, a signal processing section 31 and a decision section 17. The ringing tone generating section 11, the vibrator 12, the light emitting section 13, the microphone 14 and the decision section 17 are the same as those in FIG. 1.

The signal processing section 31 is a DSP (Digital Signal Processor) which performs digital signal processing, such as data compression, and acquires a frequency distribution by analyzing signals of ambient sounds received by the microphone 14. Further, from peak values in a voice band and peak values in other bands from the frequency distribution, the signal processing section 31 finds out which one of a speech component and a noise component is the dominant component. The signal processing section 31 also finds out if the peak value of the dominant component exceeds a predetermined threshold value. Here, the signal processing section 31 analyzes which one of the set conditions shown in FIG. 3 is matched and the decision section 17 selects incoming call ringing means based on the analysis result.

The signal processing section 31 may analyze which one of the set conditions shown in FIG. 6 is matched and the decision section 17 may select incoming call ringing means based on the analysis result. The signal processing section 31 may determine from the volume over the entire frequency band that the ambient sounds are large enough for a user to be unable to hear a ringing tone. In this case, a threshold value for making comparison with the entire volume is used instead of using the second voice threshold value and the second noise threshold value used in FIG. 6.

Therefore, the mobile terminal device in FIG. 8 processes the signals of the ambient sounds and analyzes the relationship between the levels of a speech component and a noise component and the level of a dominant one of them in the signal processing section 31. The mobile terminal device determines at least a single optimal one of the ringing tone generating section 11, the vibrator 12 and the light emitting section 13 in the decision section 17 from the analysis result. Thus, the incoming call ringing which is suitable for the situation predictable from the ambient sounds can be executed and the user will not bother people around by forgetting the setting of the manner mode or will not miss an incoming call.

As the signal processing section 31 can share a DSP that the mobile terminal device already has, it is unnecessary to add a DSP for realizing its functions. Also, it does not interfere with reduction of the size and weight of the mobile terminal device and does not increase the cost so much.

Another embodiment of the invention will be described with reference to the accompanying drawings.

Figure 9:
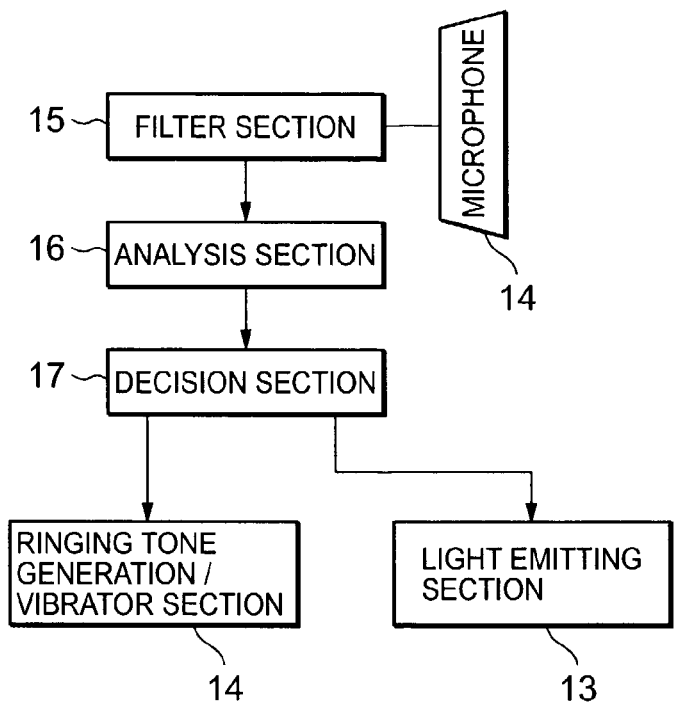
FIG. 9 is a block diagram showing the structure of a mobile terminal device according to another embodiment of the invention.

FIG. 9 is a block diagram showing the structure of a mobile terminal device according to another embodiment of the invention. Referring to FIG. 9, the mobile terminal device has a ringing tone generation/vibrator section 41, a light emitting section 13, a microphone 14, a filter 15, an analysis section 16 and a decision section 17. The light emitting section 13, the microphone 14, the filter 15, the analysis section 16 and the decision section 17 are the same as those of the mobile terminal device in FIG. 1.

The ringing section 41 has the functions of the ringing tone generating section 11 and the vibrator 12 in FIG. 1.

Figure 10:
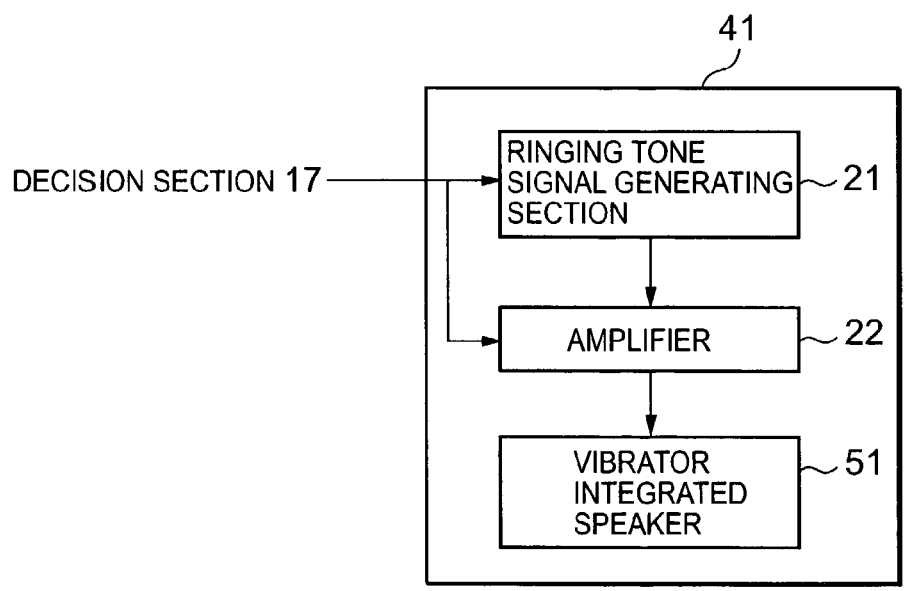
FIG. 10 is a block diagram showing the structure of the ringing section 41.

FIG. 10 is a block diagram showing the structure of the ringing section 41. Referring to FIG. 10, the ringing section 41 has a ringing tone signal generating section 21, an amplifier 22 and a vibrator integrated speaker 51. The ringing tone signal generating section 21 and the amplifier 22 are the same as those in FIG. 2. The vibrator integrated speaker 51 has the functions of a vibrator and a speaker. The vibrator integrated speaker 51 generates vibration when a low-frequency signal of about 100 Hz is input and generates a tone when supplied with a signal in a voice band.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A mobile terminal device comprising:
a plurality of notifying means for notifying a user of an incoming call;
detecting means for detecting ambient sounds;
separating means for separating the ambient sounds into a first component in a voice band and a second component in a band other than said voice band;
controlling means for controlling said notifying means on the basis of said first component and said second component;
analyzing means for determining that one of said first component and said second component is the dominant component from a relationship between volumes thereof; and
selecting means for selecting at least one of said plurality of notifying means based on which one of said first component and said second component is a dominant component and a volume of the dominant component.

2. The mobile terminal device as claimed in claim 1, wherein said first component is a speech component and said second component is a non-speech component.

3. The mobile terminal device as claimed in claim 2, wherein said plurality of notifying means comprises at least one of a tone ringing means, a vibrating means or a light emitting means.

4. The mobile terminal device as claimed in claim 3, wherein said selecting means selects said vibrating means when said speech component is the dominant component and exceeds a first threshold value, selects said vibrating means when said speech component is the dominant component and is equal to or smaller than said first threshold value, selects said vibrating means and said tone ringing means when said non-speech component is the dominant component and exceeds a second threshold value, and selects said tone ringing means when said non-speech component is the dominant component and is equal to or smaller than said second threshold value.

5. The mobile terminal device as claimed in claim 3, wherein said selecting means selects both said vibrating means and said light emitting means when said speech component is the dominant component and is equal to or smaller than a first threshold value.

6. The mobile terminal device as claimed in claim 4, wherein said selecting means selects said vibrating means, said tone ringing means and said light emitting means when said speech component is the dominant component and exceeds a third threshold value greater than said first threshold value and when said noise component is the dominant component and exceeds a fourth threshold value greater than said second threshold value.

7. The mobile terminal device as claimed in claim 2, wherein said analyzing means determines which one of said speech component and said non-speech component is the dominant component by acquiring peak values of the volumes of said speech component and said non-speech component at least once and comparing a maximum of said peak values of said speech component with a maximum of said peak values of said non-speech component.

8. The mobile terminal device as claimed in claim 2, wherein said analyzing means determines which one of said speech component and said non-speech component is the dominant component by acquiring peak values of the volumes of said speech component and said non-speech component at least once and comparing an average value of said peak values of said speech component with an average value of said peak values of said non-speech component.

9. The mobile terminal device as claimed in claim 2, wherein said analyzing means determines the band of said non-speech component beforehand, and determines which one of said speech component and said non-speech component is the dominant component by acquiring integral values of the volumes of said speech component and said non-speech component at least once and comparing a maximum of said integral values of said speech component with a maximum of said integral values of said non-speech component.

10. The mobile terminal device as claimed in claim 2, wherein said analyzing means determines the band of said non-speech component beforehand, and determines which one of said speech component and said non-speech component is the dominant component by acquiring integral values of the volumes of said speech component and said non-speech component at least once and comparing an average value of said integral values of said speech component with an average value of said integral values of said non-speech component.

11. The mobile terminal device as claimed in claim 2, wherein said analyzing means determines which one of said speech component and said non-speech component is the dominant component by using a correlation function.

12. The mobile terminal device as claimed in claim 3, wherein said analyzing means changes a volume of said tone ringing means in accordance with the volume of the dominant component.

13. The mobile terminal device as claimed in claim 3, wherein said analyzing means changes a timbre of said tone ringing means in accordance with the volume of the dominant component.

14. The mobile terminal device as claimed in claim 2, wherein said analyzing means periodically updates which one of said speech component and said non-speech component is the dominant component.

15. The mobile terminal device as claimed in claim 2, wherein said analyzing means updates which one of said speech component and said non-speech component is the dominant component at the time of performing location registration.

16. The mobile terminal device as claimed in claim 1, wherein said detecting means comprises a microphone.

17. The mobile terminal device as claimed in claim 1, wherein said separating means comprises a filter.

18. The mobile terminal device as claimed in claim 3, wherein said tone ringing means comprises a ringing tone signal generator and a speaker.

19. The mobile terminal device as claimed in claim 18, wherein said tone ringing means further comprises an amplifier.

20. The mobile terminal device as claimed in claim 3, wherein said vibrating means comprises a vibrator.

21. The mobile terminal device as claimed in claim 3, wherein said light emitting means comprises a light emitting diode.

22. The mobile terminal device as claimed in claim 3, wherein said light emitting means comprises a backlight.

23. The mobile terminal device as claimed in claim 3, wherein said light emitting means comprises a display panel that changes colors.

24. An incoming call ringing method for a mobile terminal device comprising:
    detecting ambient sounds;
    separating said ambient sounds into a first component in a voice band and a second component in a band other than said voice band;
    determining how to notify a user of an incoming call in accordance with said first component and said second component;
    receiving said incoming call;
    notifying a user of said incoming call on the basis of said determination of user notification;
    determining that one of said first component and said second component is the dominant component from a relationship between volumes thereof; and
    controlling said user notification based on which one of said first component and said second component is the dominant component and a volume of that dominant component.

25. The incoming call ringing method for a mobile terminal device as claimed in claim 24, wherein said first component is a speech component and said second component is a non-speech component.

26. The incoming call ringing method for a mobile terminal device as claimed in claim 24, wherein said user notification is at least one of ringing tones, vibrating and emitting light.

27. A mobile terminal device comprising:
    a plurality of notifying portions that notify a user of an incoming call;
    a detector that detects ambient sounds;
    a separator that separates said ambient sounds into a first component in a voice band and a second component in a band other than said voice band;
    controller that controls said notifying portions on the basis of said first component and said second component;
    an analyzer that determines that one of said first component and said second component is the dominant component from a relationship between volumes thereof; and
    a selector that selects at least one of said plurality of notifying portions based on which one of said first component and said second component is the dominant component and a volume of that dominant component.

28. The mobile terminal device as claimed in claim 27, wherein said first component is a speech component and said second component is a non-speech component.

29. The mobile terminal device as claimed in claim 28, wherein said plurality of notifying portions comprise at least one of a tone ringing portion, a vibrator or a light emitting portion.

30. The mobile terminal device as claimed in claim 29, wherein said selector selects said vibrator when said speech component is the dominant component and exceeds a first threshold value, selects a vibrator when said speech component is the dominant component and is equal to or smaller than said first threshold value, selects said vibrator and said tone ringing portions when said non-speech component is the dominant component and exceeds a second threshold value, and selects said tone ringing portions when said non-speech component is the dominant component and is equal to or smaller than said second threshold value.

31. The mobile terminal device as claimed in claim 29, wherein said selector selects both said vibrator and said light emitting portion when said speech component is the dominant component and is equal to or smaller than a first threshold value.

32. The mobile terminal device as claimed in claim 30, wherein said selector selects said vibrator, said tone ringing portion and said light emitting portion when said speech component is the dominant component and exceeds a third threshold value greater than said first threshold value and when said noise component is the dominant component and exceeds a fourth threshold value greater than said second threshold value.

33. The mobile terminal device as claimed in claim 28, wherein said analyzer determines which one of said speech component and said non-speech component is the dominant component by acquiring peak values of the volumes of said speech component and said non-speech component at least once and comparing a maximum of said peak values of said speech component with a maximum of said peak values of said non-speech component.

34. The mobile terminal device as claimed in claim 28, wherein said analyzer determines which one of said speech component and said non-speech component is the dominant component by acquiring peak values of the volumes of said speech component and said non-speech component at least once and comparing an average value of said peak values of said speech component with an average value of said peak values of said non-speech component.

35. The mobile terminal device as claimed in claim 28, wherein said analyzer determines the band of said non-speech component beforehand, and determines which one of said speech component and said non-speech component is the dominant component by acquiring integral values of the volumes of said speech component and said non-speech component at least once and comparing a maximum of said integral values of said speech component with a maximum of said integral values of said non-speech component.

36. The mobile terminal device as claimed in claim 28, wherein said analyzer determines the band of said non-speech component beforehand, and determines which one of said speech component and said non-speech component is the dominant component by acquiring integral values of the volumes of said speech component and said non-speech component at least once and comparing an average value of said integral values of said speech component with an average value of said integral values of said non-speech component.

37. The mobile terminal device as claimed in claim 28, wherein said analyzer determines which one of said speech component and said non-speech component is the dominant component by using a correlation function.

38. The mobile terminal device as claimed in claim 29, wherein said analyzer changes a volume of said tone ringing portion in accordance with the volume of the dominant component.

39. The mobile terminal device as claimed in claim 29, wherein said analyzer changes a timbre of said tone ringing portion in accordance with the volume of the dominant component.

40. The mobile terminal device as claimed in claim 28, wherein said analyzer periodically updates which one of said speech component and said non-speech component is the dominant component.

41. The mobile terminal device as claimed in claim 28, wherein said analyzer updates which one of said speech component and said non-speech component is the dominant component at the time of performing location registration.

42. The mobile terminal device as claimed in claim 27, wherein said detector comprises a microphone.

43. The mobile terminal device as claimed in claim 27, wherein said separator comprises a filter.

44. The mobile terminal device as claimed in claim 29, wherein said tone ringing portion comprises a ringing tone signal generator and a speaker.

45. The mobile terminal device as claimed in claim 44, wherein said tone ringing portion further comprises an amplifier.

46. The mobile terminal device as claimed in claim 29, wherein said light emitting portion comprises a light emitting diode.

47. The mobile terminal device as claimed in claim 29, wherein said light emitting portion comprises a backlight.

48. The mobile terminal device as claimed in claim 29, wherein said light emitting portion comprises a display panel that changes colors.

49. A mobile terminal device comprising:
a plurality of notifying portions that notify a user of an incoming call;
a detector that detects ambient sounds;
a signal processor that separates said ambient sounds into a first component in a voice band and a second component in a band other than said voice band; and
a controller that controls said notifying portions on the basis of said first component and said second component, wherein
said signal processor determines that one of said first component and said second component is a dominant component from a relationship between volumes thereof, and
said controller selects at least one of said plurality of notifying portions based on which one of said first component and said second component is the dominant component and a volume of that dominant one.

50. The mobile terminal device as claimed in claim 49, wherein said first component is a speech component and said second component is a non-speech component.

51. The mobile terminal device as claimed in claim 50, wherein said plurality of notifying portions comprise a tone ringing portion, a vibrator and a light emitting portion.

52. The mobile terminal device as claimed in claim 51, wherein said controller selects said vibrator when said speech component is the dominant component and exceeds a first threshold value, selects a vibrator when said speech component is the dominant component and is equal to or smaller than said first threshold value, selects said vibrator and said tone ringing portions when said non-speech component is the dominant component and exceeds a second threshold value, and selects said tone ringing portions when said non-speech component is the dominant component and is equal to or smaller than said second threshold value.

53. The mobile terminal device as claimed in claim 51, wherein said controller selects said vibrator and said light emitting portion when said speech component is the dominant component and is equal to or smaller than a first threshold value.

54. The mobile terminal device as claimed in claim 52, wherein said controller selects said vibrator, said tone ringing portion and said light emitting portion when said speech component is the dominant component and exceeds a third threshold value greater than said first threshold value and when said noise component is the dominant component and exceeds a fourth threshold value greater than said second threshold value.

55. The mobile terminal device as claimed in claim 50, wherein said signal processor determines which one of said speech component and said non-speech component is the dominant component by acquiring peak values of the volumes of said speech component and said non-speech component at least once and comparing a maximum of said peak values of said speech component with a maximum of said peak values of said non-speech component.

56. The mobile terminal device as claimed in claim 50, wherein said signal processor determines which one of said speech component and said non-speech component is the dominant component by acquiring peak values of the volumes of said speech component and said non-speech component at least once and comparing an average value of said peak values of said speech component with an average value of said peak values of said non-speech component.

57. The mobile terminal device as claimed in claim 50, wherein said signal processor determines the band of said non-speech component beforehand, and determines which one of said speech component and said non-speech component is the dominant component by acquiring integral values of the volumes of said speech component and said non-speech component at least once and comparing a maximum of said integral values of said speech component with a maximum of said integral values of said non-speech component.

58. The mobile terminal device as claimed in claim 50, wherein said signal processor determines the band of said non-speech component beforehand, and determines which one of said speech component and said non-speech component is the dominant component by acquiring integral values of the volumes of said speech component and said non-speech component at least once and comparing an average value of said integral values of said speech component with an average value of said integral values of said non-speech component.

59. The mobile terminal device as claimed in claim 50, wherein said signal processor determines which one of said speech component and said non-speech component is the dominant component by using a correlation function.

60. The mobile terminal device as claimed in claim 51, wherein said signal processor changes a volume of said tone ringing portion in accordance with the volume of the dominant component.

61. The mobile terminal device as claimed in claim 51, wherein said signal processor changes a timbre of said tone ringing portion in accordance with the volume of the dominant component.

62. The mobile terminal device as claimed in claim 50, wherein said signal processor periodically updates which one of said speech component and said non-speech component is the dominant component.

63. The mobile terminal device as claimed in claim 50, wherein said signal processor updates which one of said speech component and said non-speech component is the dominant component at the time of performing location registration.

64. The mobile terminal device as claimed in claim 49, wherein said detector comprises a microphone.

65. The mobile terminal device as claimed in claim 49, wherein said signal processor comprises a digital signal processor.

66. The mobile terminal device as claimed in claim 51, wherein said tone ringing portion comprises a ringing tone signal generator and a speaker.

67. The mobile terminal device as claimed in claim 66, wherein said tone ringing portion further comprises an amplifier.

68. The mobile terminal device as claimed in claim 51, wherein said light emitting portion comprises a light emitting diode.

69. The mobile terminal device as claimed in claim 51, wherein said light emitting portion comprises a backlight.

70. The mobile terminal device as claimed in claim 51, wherein said light emitting portion comprises a display panel that changes colors.

71. A mobile terminal device comprising:
a plurality of notifying means for notifying a user of an incoming call;
detecting means for detecting ambient sounds;
separating means for separating the ambient sounds into a first component in a voice band and a second component in a band other than said voice band;
controlling means for controlling said notifying means on the basis of said first component and said second component,
wherein the control means selects at least one of said plurality of notifying means based on said first component and said second component.

72. The mobile terminal device as claimed in claim 71, wherein said plurality of notifying means comprises at least one of vibrating means or light emitting means.

73. An incoming call ringing method for a mobile terminal device comprising:
detecting ambient sounds;
separating said ambient sounds into a first component in a voice band and a second component in a band other than said voice band;
determining how to notify a user of an incoming call in accordance with said first component and said second component;
receiving said incoming call; and
notifying a user of said incoming call on the basis of said determination of user notification,
wherein the step of determining further comprises selecting at least one of a plurality of notifying portions based on said first component and said second component.

74. The incoming call ringing method for a mobile terminal device as claimed in claim 73, wherein said plurality of notifying portions comprises at least one of a vibrator or a light emitting portion.

75. A mobile terminal device comprising:
a plurality of notifying portions that notify a user of an incoming call;
a detector that detects ambient sounds;
a separator that separates said ambient sounds into a first component in a voice band and a second component in a band other than said voice band; and
controller that controls said notifying portions on the basis of said first component and said second component, wherein the controller selects at least one of said plurality of notifying portions based on said first component and said second component.

76. The mobile terminal device as claimed in claim 75, wherein said plurality of notifying portions comprises at least one of a vibrator or a light emitting portion.

77. A mobile terminal device comprising:
a plurality of notifying portions that notify a user of an incoming call;
a detector that detects ambient sounds;
a signal processor that separates said ambient sounds into a first component in a voice band and a second component in a band other than said voice band; and
a controller that controls said notifying portions on the basis of said first component and said second component,
wherein the controller selects at least one of said plurality of notifying portions based on said first component and said second component.

78. The mobile terminal device as claimed in claim 77, wherein said plurality of notifying portions comprises at least one of a vibrator or a light emitting portion.

* * * * *